Nov. 17, 1936.   H. ESCHENBACHER ET AL   2,061,271
SCALE
Filed March 17, 1934   4 Sheets-Sheet 1
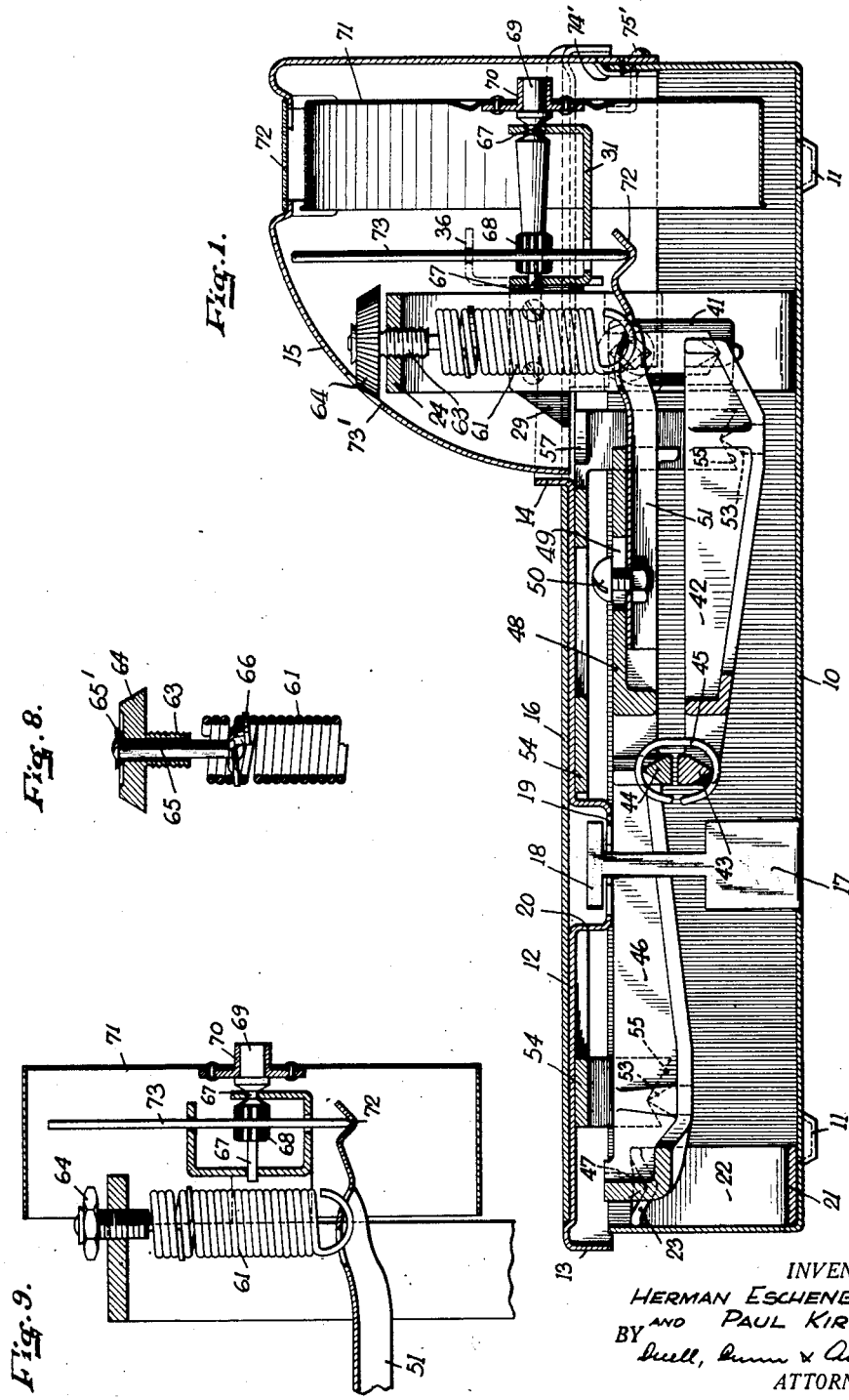
INVENTORS.
HERMAN ESCHENBACHER
AND PAUL KIRCHER,
BY Duell, Dunn & Anderson
ATTORNEYS.

Nov. 17, 1936.  H. ESCHENBACHER ET AL  2,061,271
SCALE
Filed March 17, 1934  4 Sheets-Sheet 2
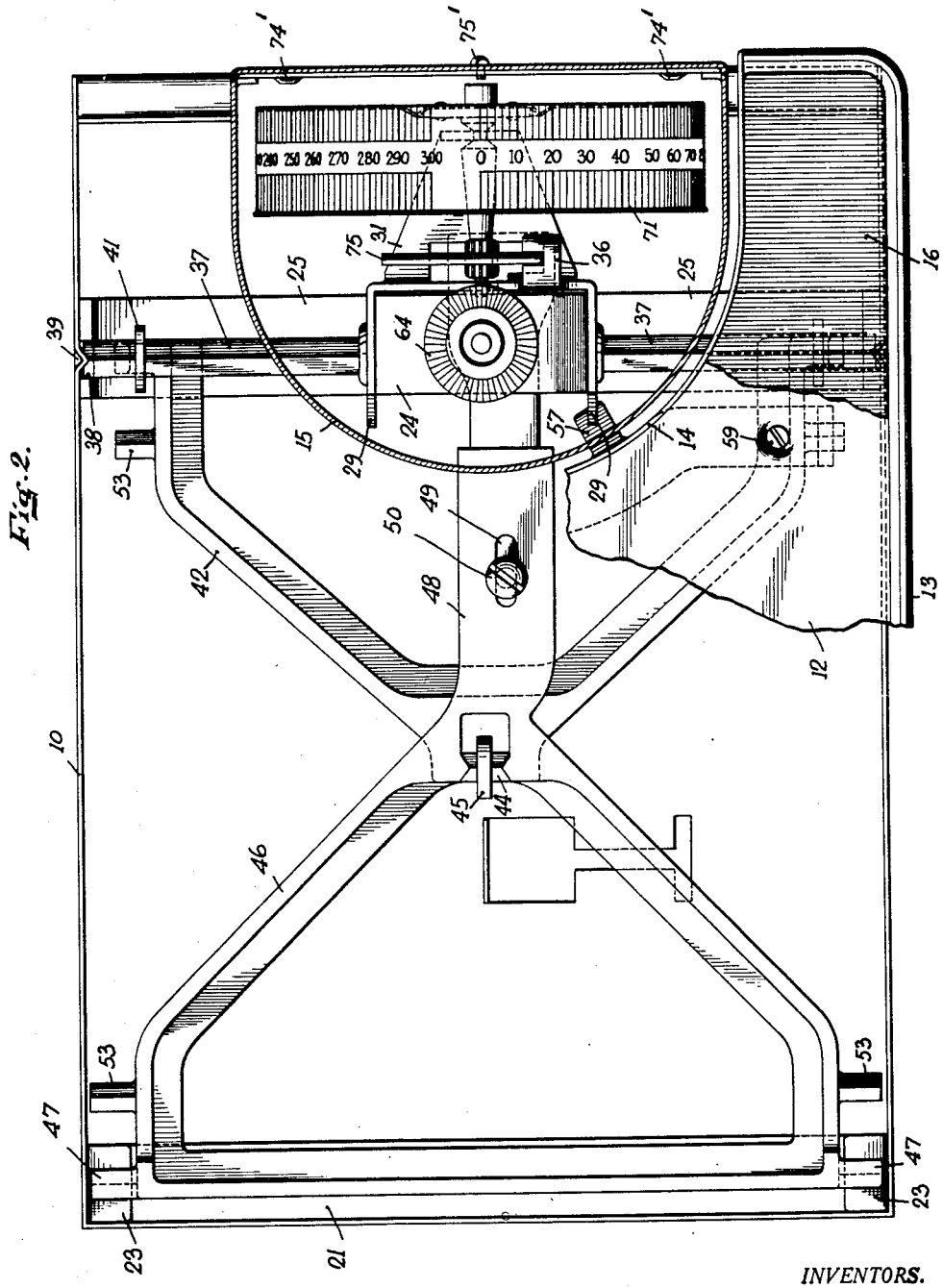
INVENTORS.
HERMAN ESCHENBACHER
BY AND PAUL KIRCHER,
ATTORNEYS.

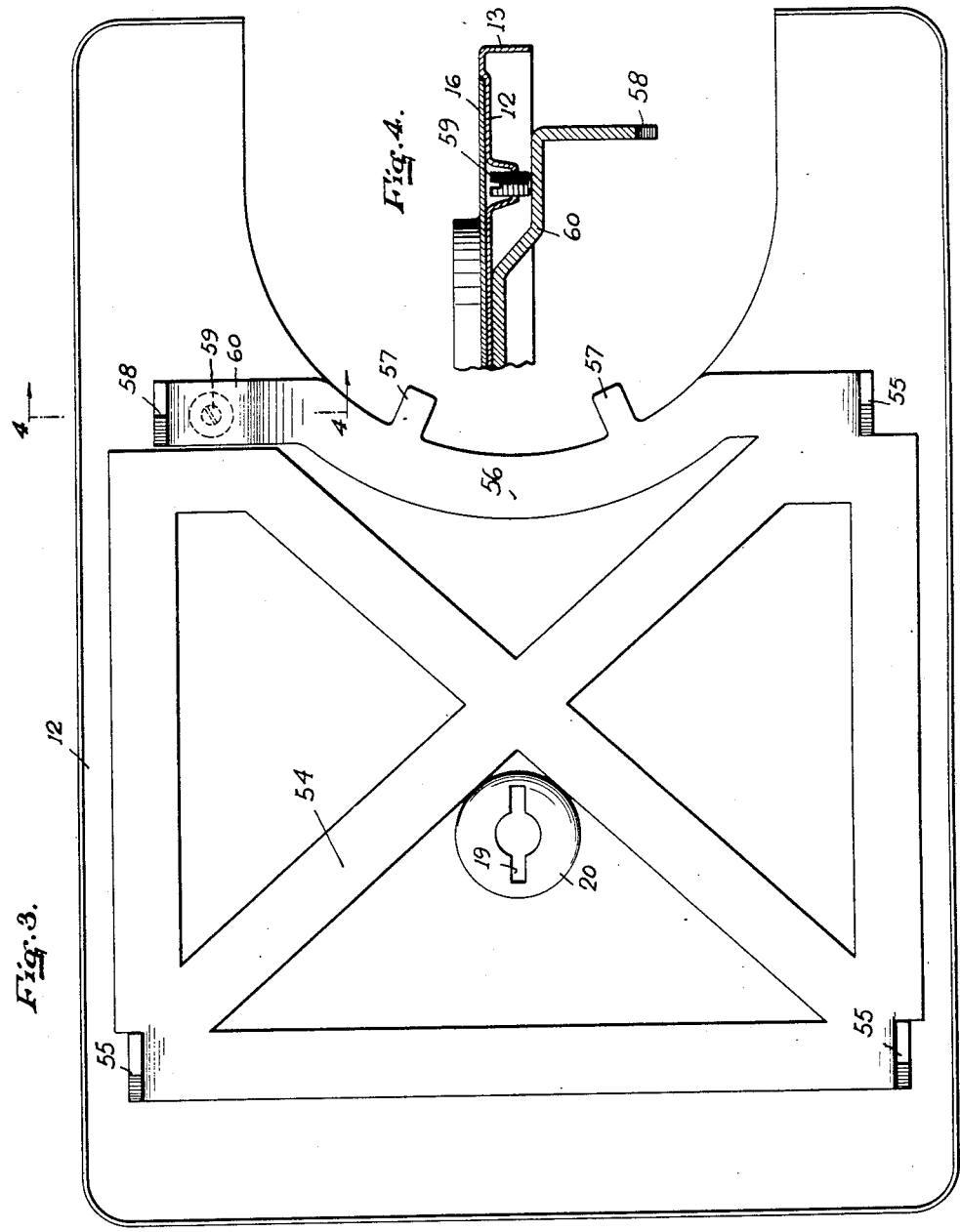

Nov. 17, 1936.   H. ESCHENBACHER ET AL   2,061,271
SCALE
Filed March 17, 1934   4 Sheets-Sheet 4
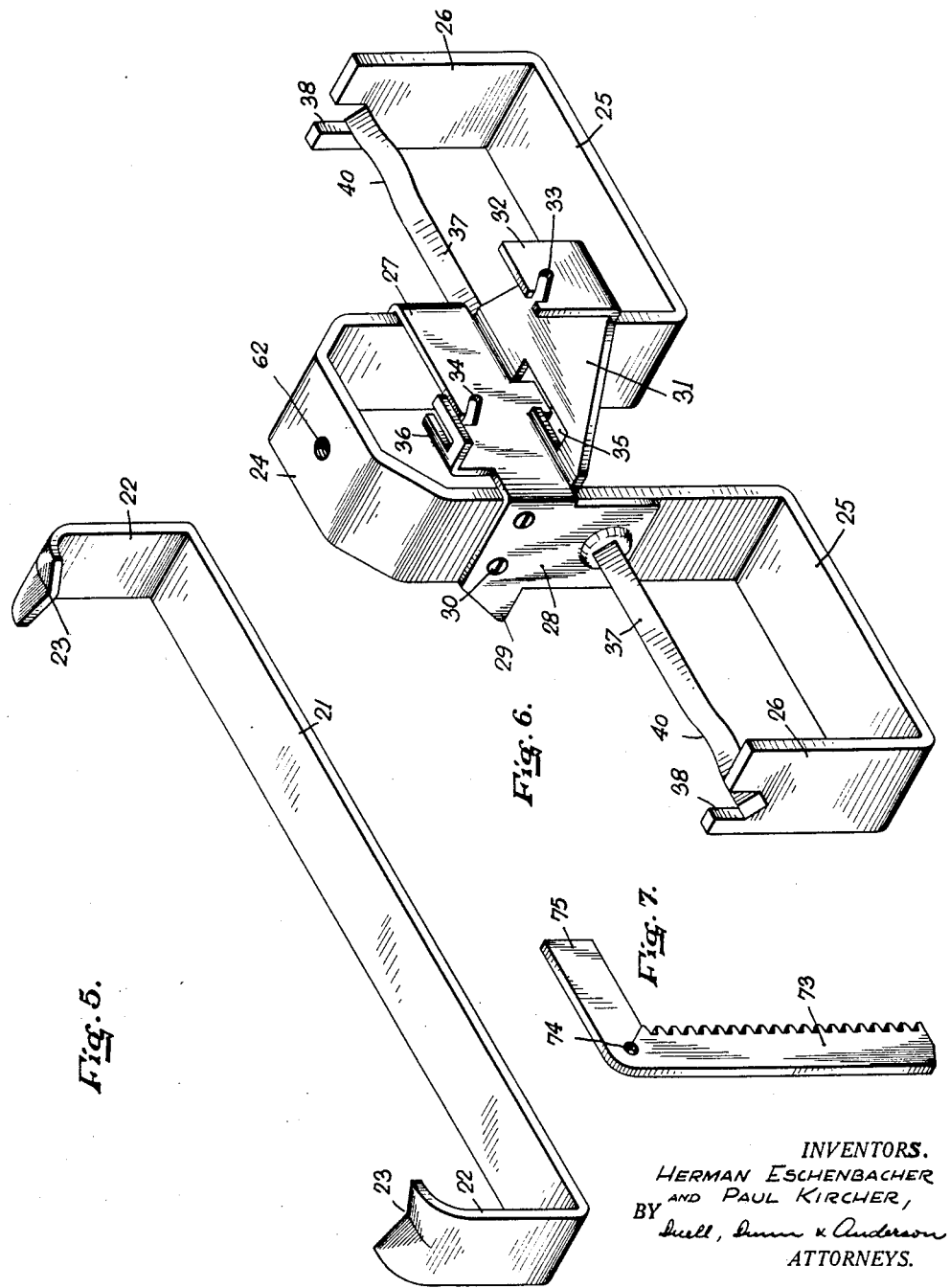
INVENTORS.
HERMAN ESCHENBACHER
AND PAUL KIRCHER,
BY
ATTORNEYS.

Patented Nov. 17, 1936

2,061,271

UNITED STATES PATENT OFFICE 2,061,271

SCALE

Herman Eschenbacher, Ridgewood, and Paul Kircher, Brooklyn, N. Y., assignors to The Jacobs Bros. Co. Inc., Brooklyn, N. Y., a corporation of New York Application March 17, 1934, Serial No. 716,070

8 Claims. (Cl. 265—68)

This invention relates to a functionally and structurally improved scale, and while the teachings of the invention may be employed in numerous different connections, it is primarily intended that they be embodied in scales of the platform type.

It is an object of the invention to provide a scale which will embody relatively few parts, each individually simple and rugged in construction, these parts being readily capable of manufacture by automatic machinery and assemblage by relatively unskilled labor, to furnish a mechanism which will operate with precision over long periods of time and with freedom from mechanical difficulties.

A further object of the invention is that of furnishing a scale in which the services of a skilled operator will be required only for a relatively small period of time, in that, as afore brought out, the parts may be assembled by unskilled labor, and when so assembled the skilled operator, by means of a simple adjustment, will be capable of setting the scale to a "true" condition, which condition will prevail for an indefinite period unless the scale be subjected to unusual abuse.

Still another object is that of furnishing a scale in which an extremely simplified form of construction may be included without this construction affecting detrimentally the functioning of the apparatus. Consequently, a reputable manufacturer may manufacture and distribute the scale and sell the same at a greatly reduced figure than would otherwise be possible.

It is, however, to be understood that the teachings of the present invention, while preferably embodied in a platform scale, and, moreover, in a scale which may be sold at nominal cost, might be individually or collectively included in a more expensive or different type of scale.

With these and other objects in mind, reference is had to the attached sheets of drawings illustrating practical embodiments of the invention, and in which—

Fig. 1 is a longitudinal section of a scale;

Fig. 2 is a partly sectional plan view thereof;

Fig. 3 is a bottom plan view of the platform;

Fig. 4 is a fragmentary sectional view of one portion of the platform taken along the lines 4—4, and in the direction of the arrows as shown in Fig. 3;

Fig. 5 is a perspective view of one of the supporting members within the base;

Fig. 6 is a similar view of the second supporting assembly;

Fig. 7 is a perspective view of the rack bar;

Fig. 8 shows the spring adjustment which may be employed; and

Fig. 9 is a fragmentary sectional side view of an alternative form of mechanism slightly different from that illustrated in Fig. 1.

In these views the numeral 10 indicates a base, preferably made of sheet metal and in the form of an oblong container as has best been illustrated in Figs. 1 and 2. Portions of this base may be pressed out, as at 11, to provide legs or supporting pedestals. Disposed upon the base and mounted by mechanism hereinafter described is a platform which may also be formed of sheet metal and has downwardly extending flange portions 13 of an area adequate to overlap the upwardly extending flanges of the base 10. This platform throughout its forward area may have an upwardly extending flange portion 14 which lies adjacent to a housing or shell 15 enclosing the registering and spring assembly of the scale. The details of mounting this housing will be hereinafter more especially referred to, but at this time it will again be noted that this element is also preferably formed of sheet metal. Consequently, all exterior parts of the scale may be readily manufactured at nominal expense and largely by automatic machinery. The platform is, of course, preferably covered by a layer 16, of suitable material, and this member is normally retained against displacement with respect to the base by conveniently striking a portion of the latter upwardly as has been indicated at 17, and having this portion terminate in a head 18, which is threaded through a slot 19 formed in a cup-shaped depression 20 of the platform, after which the head is turned so as to be out of line with the slot and consequently prevent separation of the parts.

Positioned within the base are bearing members, especially shown in Figs. 5 and 6. The first of these members preferably includes a body 21, of strap steel or its equivalent, the ends of which are bent upwardly as at 22, and terminate in inwardly extending portions indented as at 23 to provide supports for beam bearings. This member is preferably positioned within the base, and has its lower face in contact with the surface of this unit. The upwardly extending portions 22 may be and preferably are in contact with the inner faces of the upwardly extending flange portion of the base, and these several parts may be secured against relative displacement, as, for example, by spot welding. In this manner the base is rigidified so that there may be no liability of distortion. The bearing member shown in Fig. 6 is similarly positioned in the base and preferably adjacent the rear end thereof. This member includes a body bent upwardly at its center, as at 24, to provide a supporting portion. To both sides of this supporting portion the body extends outwardly, as at 25, and upwardly, as at 26. The supporting portion 24 has secured to it a plate 27, which is also preferably formed of steel and which is bent to provide side portions 28 terminating in forwardly extending projections 29. This plate may be secured in position by screws 30, or otherwise, as may prove most desirable. The plate, moreover, has a rearwardly extending shelf 31, terminating in an upwardly extending portion 32. This portion is formed with an inclined slot, as at 33, to provide a bearing for the pinion shaft (hereinafter more particularly described). In line with the slot 33 the body of the plate is formed with a similar slot 34, affording a bearing for the opposite end of the shaft, and adjacent this latter slot the support or shelf 31 is formed with an opening 35, and the body 27 has an upwardly and outwardly projecting forked extension 36, providing a guide for a rack bar. The side portions 28 may be formed with openings to receive the inner ends of bearing members 37, the outer ends of which rest within slots 38 formed in the outer portions 26. These bars may be of any desired configuration (for example, square, as shown), but in any event should in effect present an upwardly extending edge portion which will furnish the functional equivalent of a knife edge bearing assembly. The inner ends of these bars simply rest within the bulged portions of the sides 28 and loosely rest at their opposite ends within the notches 38. Of course, any other method of supporting these bars might be resorted to, but the structure illustrated is preferably utilized, and in such case the side walls of the base may be indented, as at 39, in line with the notches 38, so that an accidental dislodgement or detachment of the bars after they are applied, is precluded. While not necessarily the case, the bars are preferably bent to provide depressed portions 40 in their bearing edges, so that—as will hereinafter appear—a self-centering bearing structure is provided.

Supported by the bearing structure described is a beam assembly which preferably is of the type shown in Figs. 1 and 2. In these figures it will be noted that the bars support, by means of loop members 41, the inner ends of a beam 42. This beam embraces converging arm portions, and adjacent the point of juncture of these arms a bearing portion 43 is provided. Overlying this bearing is a similar portion 44 which is connected thereto by a loop 45. The portion 44 is formed at the point of juncture of the arms of a beam 46, and this beam has knife edge bearing portions 47 which rest within the indented portions 23 of the outer base bearing member. The arms of the beam 46 are continued beyond their point of juncture, as has been indicated at 48, and in this continuation a slot 49 may be formed to accommodate a bolt 50, which thus adjustably secures a spring coupling and rack actuating member 51 to this beam. The beam 42, as well as the beam 46, may be formed with outwardly extending bearing portions 53, and these bearing portions serve to support the scale platform.

The latter has been probably best illustrated in Figures 3 and 4, and includes—as afore brought out—a body 12, to the upper face of which a suitable covering 16 may be secured. To suitably rigidify this platform there may be secured to the under face of the same a frame member generally indicated at 54, and formed of steel or other suitable material. Adjacent three of its corners this frame is notched, and the resultant integral portions of the same are bent downwardly to form bearing elements 55, which present V-shaped edges suitable for cooperation with the bearing elements 53 upon which they rest. As viewed in Figure 3, the upper right hand portion of the frame is formed differently than the remaining portions thereof. This is due to the fact that the frame has an extension 56 conforming—if desired— to the notched rear edge of the platform as defined by the flange 14. A projecting portion 57 forms a part of the extension 56, and the latter terminates in line with the lower right hand bearing portion 55 and, as viewed in this figure, in a similar bearing portion 58. At a point short of this bearing portion but in line with the extension 56, the platform is recessed and tapped and threaded to mount an adjusting screw or bolt 59. This has been especially shown in Figures 2 and 4, and in the latter figure it will also be noted that at a point short of the bearing portion 58 the extension is depressed downwardly, as at 60. Consequently, when the platform is mounted upon the bearings 53 with the screw 59 materially retracted, it may be found that all bearings are perfectly true, and that the platform rests equally on all bearing portions 53. However, due to variations in manufacture, this is unlikely. Consequently, in manufacture the depressed portion 60 should usually be made with a tolerance such that, with the screw 59 retracted, the bearing portion 58 will not be projected to a sufficient extent. Therefore, an operator, by simply projecting this bearing portion by means of the bolt and screw 59, can bring the parts into "true" with the expenditure of but little time and effort.

To provide a mechanism which will resist downward movement of the platform, one or more springs 61 may be employed. These springs are of the type which resist expansion, and if—as is preferably the case—but a single spring is utilized, the lower end of the same may simply be hooked through an opening centrally formed in the member 51. This member as shown, is preferably constructed in such manner that it is quite rigid, and thus no fear may be felt of its buckling or bending when strain is imposed. The spring is housed within the space defined by the central supporting portion 24 of the forward bearing member, and adjacent the peak of this member a screw threaded opening 62 is provided, and these threads cooperate with threads formed in the shank 63 of a bolt having a knurled head 64. This bolt is bored so that it may rotatably accommodate a rod 65, the upper end of which is rotatably mounted as at 65' upon the upper surface of the head 64. At its lower end the rod 65 mounts a washer or the equivalent, which in any event has a spirally extending flange of a diameter such that it may properly fit between the convolutions of the spring. Consequently, when the head 64 is turned, the rod will rise or fall to correspondingly shift the position of the spring and change the adjustment of the scale. In setting up the latter it may, of course, be desirable to have the spring assume one general position. To this end, by a forcible turning of the rod (which may have a portion of its body squared to permit of gripping with a wrench), the washer may be caused to assume various positions with respect to the spring end, and thus the desired results are achieved. However, an accidental turning of the washer will, of course, be substantially precluded by virtue of the frictional engagement which exists between the spring convolutions and the flange 66 of the latter.

Now with a view to providing a suitable registering mechanism, it will be noted that a pinion shaft is employed which rests within the base of the inclined slots 33 and 34. This shaft is machined to provide reduced portions 67, which rest within the aforementioned slots. It mounts or is formed integrally with a pinion 68, and has beyond the slot 33 a portion 69 which mounts the hub 70 of a registering drum 71. Thus, while the shaft may be readily moved into or moved from position within the slots 33—36, any movements other than rotational will not occur even if the mechanism is subjected to violent shocks. To drive this mechanism the member 51 is formed with a crotch 72 adjacent its outer end, and within this crotch rests the end of a rack member 73, which has its upper end slotted as at 74 and bent to extend at right angles as at 75. The member 73 may, of course, have its lower end rounded as shown in Fig. 1, to reduce friction at this point, and it is guided by passing upwardly through the opening 35 and between the arms of the forked extension 36. Incident to the over-balancing structure furnished by the arm 75, intimacy of contact between the rack teeth and the teeth of the pinion will be constantly assured, and it will be appreciated that an operator, by simply positioning the dial 71 with the pinion shaft portion 67 disposed in the base of the slots 33—34, may thereupon drop the rack between the arms of the fork 36 and the opening 35, and the latter will come to rest within the crotch 72, with the dial positioned as shown in Fig. 2. Thereafter, the shell 15 may be disposed in position, and it will be understood that the extensions 57 will lie below the projections 29, so that displacement and strain upon the parts at this point is precluded. Moreover, the shell is, of course, formed with a window or sight opening 72, as well as an opening 73', through which the knurled surface of the head 64 is accessible.

If an assembly different from the structure in Fig. 1 is desired in order to provide for increased compactness as well as a more protective housing of the parts, a set-up as shown in Fig. 9 may be employed. In this figure the pinion and rack bar are housed within the space defined by the dial, and to this end the supporting parts, as well as the associated mechanism, are merely modified as to their proportions.

In manufacturing a scale of this nature, it will, of course, be understood that an extremely simple procedure is permissible. Those parts which are preferably formed of sheet metal,— i. e., the base, the platform, and the housing or shell 15, are simply stamped out. Thereupon the platform receives the frame, as in Fig. 3, and this frame is secured in position by spot welding or otherwise. The base receives the bearing elements and assembly, as shown in Figs. 5 and 6, which are likewise spot welded or otherwise attached to the base. Thereupon by dropping the bars 37 into position after introducing their inner ends into the openings of the side portions 28, the adjacent portion of the base is indented or upset to prevent accidental removal of the bars. The beams are now positioned upon or supported from the bearing portions 23 and 40, and are interconnected. Of course, prior to this the spring is brought to its proper position, and may be coupled to the member 51. This member is now connected to the beam structure, it being, of course, obvious that such connection might be established prior to introducing the beam structure into position within the base. The pinion shaft is dropped into position and the rack is likewise positioned. All of the foregoing may be accomplished by relatively unskilled labor. The skilled operator now simply trues up the scale by adjusting the screw 59, the member 51, and the washer 66. Such adjustments are readily achieved by a skilled person, and consequently the scale, from both the manufacturing as well as the assembly and correcting viewpoint, may be manufactured at a nominal cost. If desired, a relatively unskilled operator may, by simply turning the head 18, lock the platform, and thereupon the covering 16 is applied. The shell 15 preferably has indented portions 74' which cooperate with adjacent edge portions of the base flange, and finally these parts may be locked by a screw 75'.

In conclusion, it will be appreciated that while the body 25 is preferably formed of bearing material, this may not necessarily be the case, in that the bars 40 furnish the direct bearing support. The latter, having depressed portions, will cause the loops 41 to centralize, and it will, of course, be understood that the plate 27 is preferably formed of steel or its equivalent, so that difficulties incident to a non-bearing material are avoided.

Thus, among others, the objects of the invention as specifically afore noted are achieved. It will be appreciated that numerous changes in structure and rearrangements of the parts might be resorted to without departing from the spirit of the invention as defined by the claims.

Having thus fully described the invention, what is claimed as new and desired to be protected by Letters Patent is:

1. A scale including, in combination, a base, a platform movable upon said base, said platform being formed with a slot, and an extension integral with said base and struck up from the same and to extend through said slot to retain the parts in assembled conditions, said extension being formed of a bendable metal whereby the same may be distorted subsequent to passing through said slot to lock the parts.

2. A scale including, in combination, a base and a bearing supporting frame disposed within and secured to said base, said frame comprising a strap member bent to provide bearing supporting portions, and a plate secured to said strap and formed with downwardly inclined slots presenting pinion shaft bearings.

3. In a scale, a platform and a rigidifying frame secured to the under side of said platform, integral portions of said frame providing platform supporting bearings, an extension forming a part of said frame and shiftable with respect to the same, and an adjusting means mounted by said platform and bearing against said extension, said extension presenting a bearing portion, actuation of said adjusting means shifting the frame extension to bring the portion thereof into proper relative position with respect to the other bearing portions of said frame.

4. A scale including in combination a sheet metal base, a platform formed with a depressed portion having an opening in its surface, a portion struck out of said base and extending angularly with respect to the surface of the latter, the end of such portion being extendible through the opening in the base of the depressed portion and being bent out of line with such opening to retain said platform against displacement with respect to said base, and weighing mechanism disposed within such base and supporting such platform.

5. As an article of manufacture, a scale platform including a sheet metal body, a frame for reinforcing such body and including a plurality of strap-shaped portions in contact with the under face of the platform and secured thereto, the end of certain of said portions being extended downwardly to provide a plurality of platform bearings, an extension forming a part of said frame and having restricted movement with respect to such platform, a bearing portion forming a part of such extension, and means associated with said platform for shifting such latter bearing portion into a proper relative position with respect to the remaining bearing portions.

6. A scale including a base, a member disposed within such base and including portions bent to provide an upwardly extending central part and spaced supporting end parts beyond such central part, bearing members having their outer ends mounted by such end parts, their inner ends being supported by the central part, and such members presenting upwardly extending bearing edges for the pivotal supporting of an element to be mounted.

7. A scale including a base, a member disposed within such base and including portions bent to provide an upwardly extending central part and spaced supporting end parts beyond such central part, bearing members having their outer ends mounted by such end parts, their inner ends being supported by the central part, and such members presenting upwardly extending bearing edges for the pivotal supporting of an element to be mounted, such members being additionally depressed whereby to centralize any member so pivotally mounted.

8. A scale including in combination a base, a member secured against movement with respect to such base and presenting upwardly extending parts and a bridging part between such upwardly extending parts and adjacent their upper ends, a plate secured against movement with respect to such part and including extensions bent and slotted to provide a rack-bar guide and pinion shaft bearings, such guide and bearings being disposed to one side of such bridging part and the latter providing for the support of a spring.

HERMAN ESCHENBACHER.
PAUL KIRCHER.